Inventors:
Donald L. Watrous,
John D. Harnden, Jr.
by Paul A. Frank
Their Attorney.

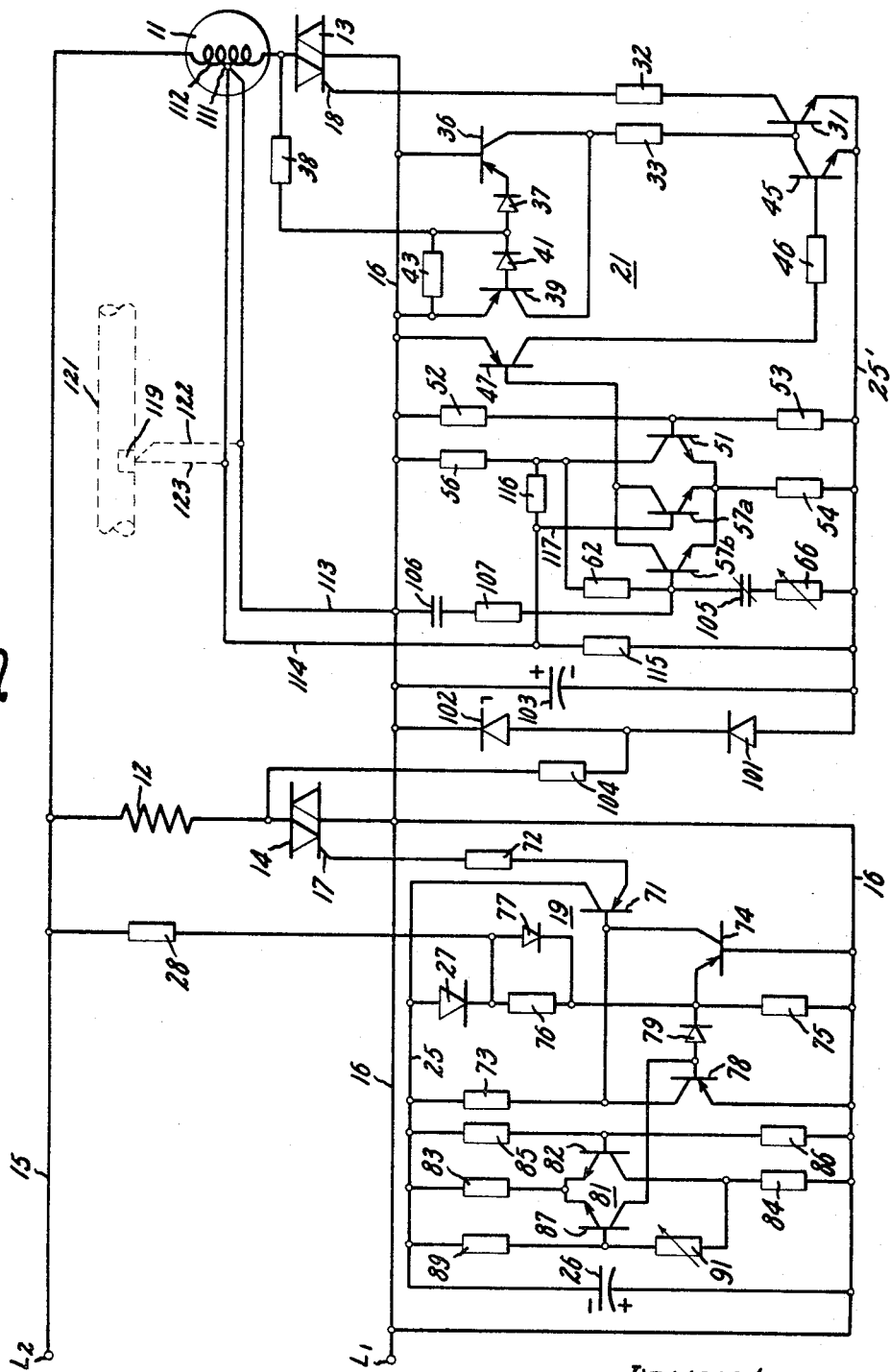

__United States Patent Office__

3,408,825
Patented Nov. 5, 1968

3,408,825
ELECTRONIC REFRIGERATION CONTROL
SYSTEM
Donald L. Watrous, Scotia, and John D. Harnden, Jr.,
Schenectady, N.Y., assignors to General Electric Company, a corporation of New York
Filed Oct. 6, 1966, Ser. No. 584,819
18 Claims. (Cl. 62—156)

ABSTRACT OF THE DISCLOSURE

A refrigerator cooling and defrosting control circuit includes controlled conducting means in the form of semiconductor devices for respectively connecting the compressor motor and the defrost means directly across alternating current power supply terminals and synchronously operable control circuit means for controlling conduction through the controlled conducting means synchronously with the zero crossing intervals of the alternating current power supply current.

---

Figure 1:
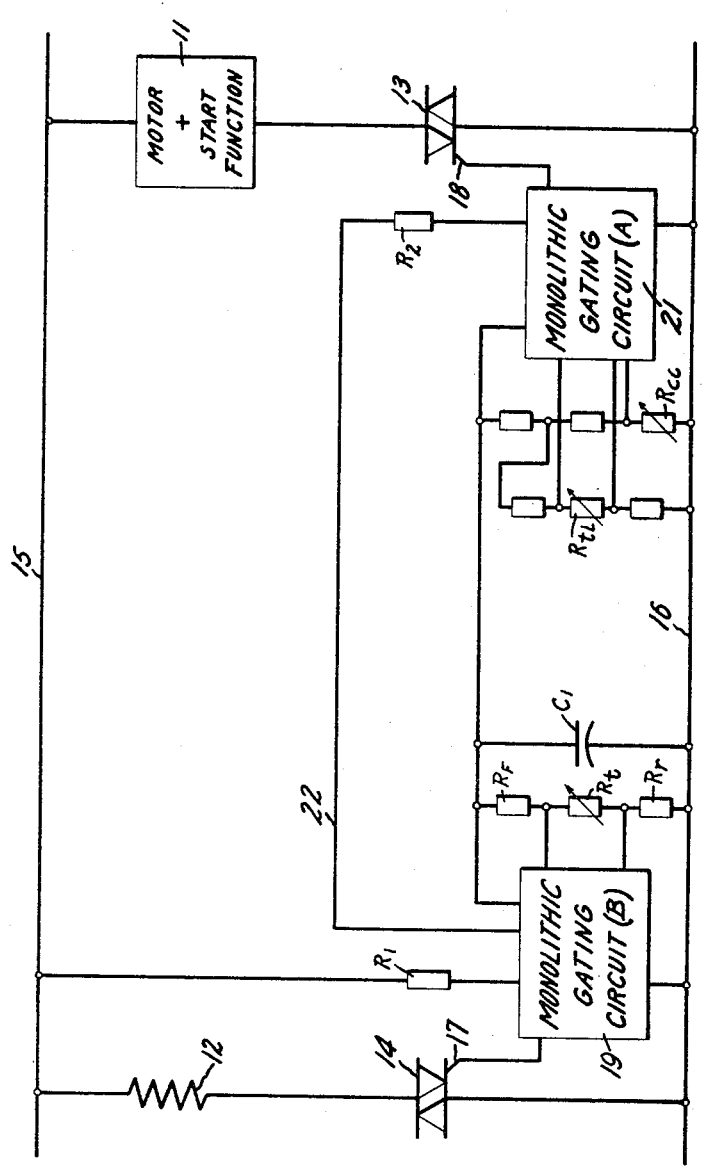

This invention relates to an electronic refrigeration control system.

More particularly, the invention relates to an all electronic control system for a refrigerator and the like which is fast responding, provides automatic defrosting, no wear or deterioration of calibration points, exhibits substantially no undesired radio frequency interference effects, and provides complete elimination of internally generated electrical or acoustical transients. The control system made available by this invention can be readily modified to include overheat protection, overpressure protection, etc., and yet is relatively inexpensive to manufacture for the reason that it can be fabricated to a great extent in integrated circuit form. In addition to these features the system includes a positive interlock to assure that the automatic defrost cannot operate while the refrigerator compressor motor is operating and vice versa, and provides a very simply designed yet highly desirable hysteresis effect between the temperature of turn on and the temperature of turn off of both the refrigerator cold control and the automatic defrost without resorting to mechanical means.

In he design of electric refrigerators which provide an automatic defrost function, it has long been recognized that the automatic cold control and automatic defrost should be fast responding to the actual condition existing in the space being refrigerated and to the actual buildup of frost in the evaporators, respectively. This approach is greatly preferred to the prescheduled cycling on and off of the automatic defrost in accordance with a predetermined time schedule or other similar means. The provision of such an automatic cold control with automatic defrost and suitable interlock to prevent the operation of one while the other is working, has been the goal of a substantial development effort. While a number of proclaimed satisfactory systems have been forthcoming as a result of this effort, many have been found wanting for a number of reasons.

A number of the known systems of this type are too cumbersome and/or expensive in that they require magnetic amplifiers, etc., which increase both the size and cost of such systems. Others require the use of temperature actuated relays which introduce thermal time lags in the response of the system to a change in the actual operating conditions of the refrigerator system. Still others, in cycling on and off at unpredictable points in a cycle of the supply alternating current potential generally employed to run such systems, either generate undesired electrical or acoustical transients within the refrigeration system itself or introduce extremely undesirable radio frequency interference effects onto the supply line which adversely affects the operation of television and/or radio sets operating in the area.

In addition to the above considerations, it is desirable that such automatic refrigeration control systems possess what is termed a hysteresis effect. By this is meant that the control system turn off at a different temperature than that at which it turned on. For example, consider the cold control of the refrigerator which determines the temperature at which the food storage space in the refrigerator, is maintained. If this control is set so that the refrigerator compressor motor is cycled on when the temperature of the space reaches say 50° F., thereby initiating a cooling cycle, then it is desirable that operation of the motor be maintained for a sufficient period of time until the temperature in the space is reduced to 45° F. or the like. The same kind of hysteresis effect is desirable in the automatic defrost. The reason why such hysteresis effect is desirable is that it minimizes the number of on-off cycles required of the system thus prolonging its operating life. In order to provide an electronic refrigeration control system overcoming the above problems and providing all of the above recited desirable features, the present invention was developed.

It is, therefore, a primary object of the present invention to provide an all electronic control system for a refrigerator which is fast responding, provides automatic defrost, no wear or deterioration of calibration points, exhibits substantially no undesirable radio frequency interference effects, eliminates internally generated electrical or acoustical transients, and includes a positive interlock to prevent simultaneous operation of the cold control and automatic defrost.

Another object of the invention is the provision of an electronic refrigeration control system having the above characteristics which can be fabricated to a great extent in an integrated circuit form and hence is relatively inexpensive to manufacture, reliable in operation, and easily serviced.

A still further object of the invention is the provision of an electronic refrigeration control system incorporating the above features which can be readily modified to include overheat protection, overpressure protection or other ancillary control functions deemed desirable for protective or other reasons.

In practicing the invention an electronic (which term as used herein includes solid state circuits) refrigeration control system is provided which exhibits substantially no undesired radio frequency interference effects and eliminates undesired internally generated transients. The refrigeration cycle system described includes a refrigeration system compressor motor and defrost means for the refrigeration system although the invention is applicable to other well known types of refrigeration cycle systems. Gate controlled conducting means (preferably comprising gate controlled triac semiconductor power devices) or radiation or field controlled semiconductor device are connected in series circuit relationship with the refrigeration system motor and defrost means, respectively, across a pair of power supply terminals adapted to be connected to a source of alternating current potential. Synchronously operable control circuit means are operatively coupled to the power supply terminals and to the gate control conducting means for controlling conduction through the gate control conducting means synchronously with the zero crossing intervals of the supply alternating current potential. In preferred embodiments of the invention, the control system further comprises interlocking means effectively intercoupled between the refrigeration system motor and the defrost means for preventing actuation of one while the other is energized. The system also preferably includes temperature sensing means operatively coupled to the space being refrigerated by the refrigeration system for sensing the temperature thereof and electrically coupled to the synchronously operable control means for controlling the operation thereof for thereby controlling operation of the refrigeration system motor. Frost buildup sensing means are also provided which are operatively coupled to the refrigeration system for sensing buildup of frost therein and deriving a control signal upon the buildup of frost reaching a predetermined level. The frost buildup sensing means is electrically coupled to the synchonously operable control means for controlling the operation thereof and thereby control the operation of the defrost means. Preferred embodiments of the invention also include differential amplifying means comprising a part of the synchronously operable control means with the differential amplifier means having bias means coupled thereto adjusted to exhibit hysteresis effects in the point of turn-on and the point of turn-off of the gate control conductivity controlled conducting means associated therewith.

If desired, further embodiments of the invention may include overheat sensing means thermally coupled to the compressor motor windings to sense overheating of the windings and to derive an override control signal indicative of the overheated condition, and means for coupling the override control signal thus derived to the synchronously operable control means for controlling the operation thereof and thereby provide an override control of the operation of the compressor motor. Alternatively, or in addition thereto further embodiments of the invention may include pressure sensing means physically coupled to the refrigeration system for sensing buildup of pressure therein above a predetermined value and for deriving an override control signal indicative of the undesird high pressure condition, and means for applying the override control signal thus derived to the synchronously operable control means for controlling the operation thereof and thereby provide an override control of the operation of the compressor motor.

Figure 2:
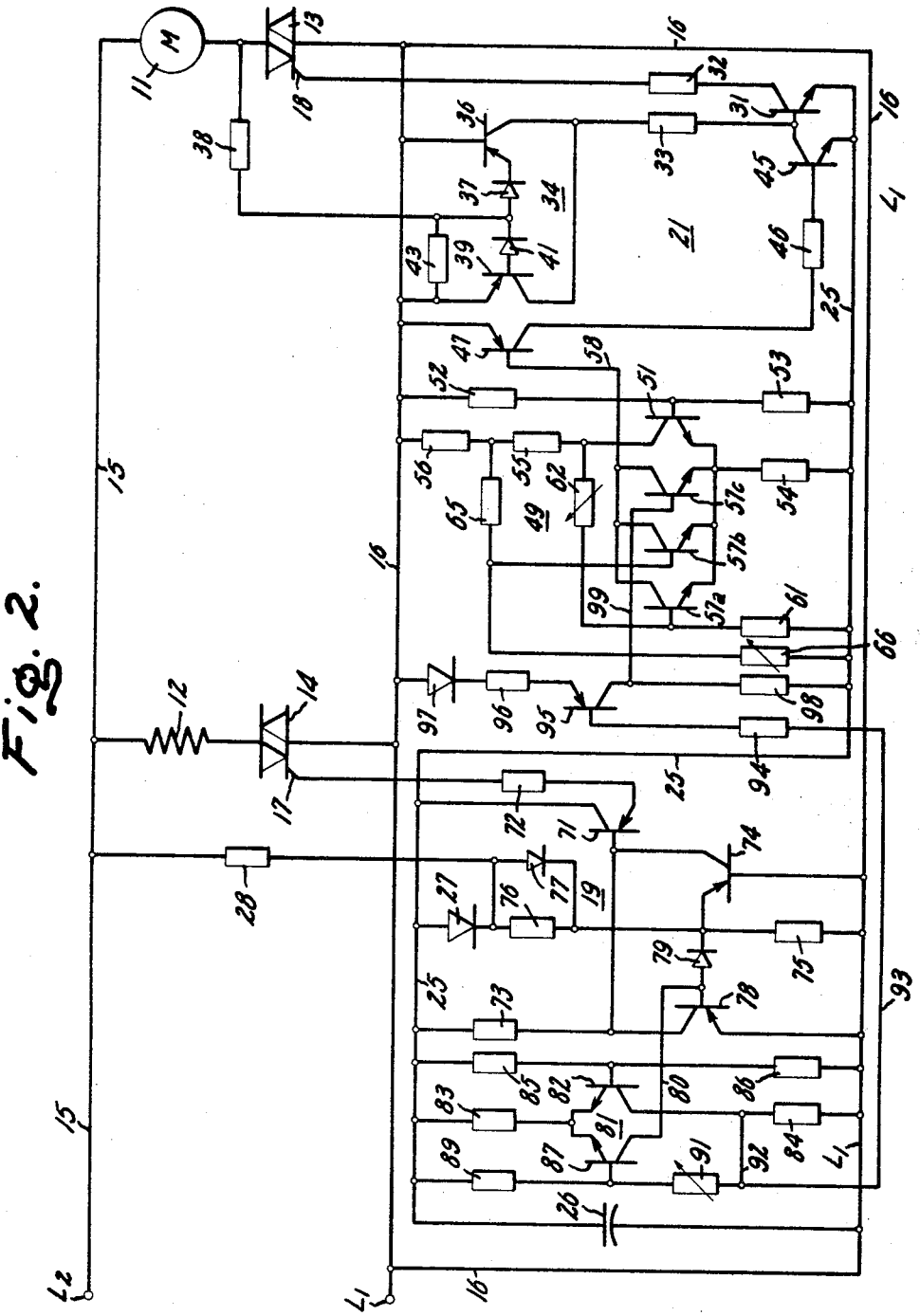

Other objects, features, and attendant advantages of this invention will become better understood in connection with the following description when considered in conjunction with the attached drawings wherein, the same reference numeral is employed in the several figures to identify corresponding parts, and wherein:

FIGURE 1 is a functional block diagram of a new and improved electronic refrigeration control system constructed in accordance with the present invention;

FIGURE 2 is a detailed circuit diagram of an all electronic refrigeration control system constructed in accordance with the present invention and illustrated schematically by the functional block diagram of FIGURE 1; and FIGURE 3 is a detailed circuit diagram of a modified form of the new and improved electronic refrigeration control system constructed in accordance with the invention, and also illustrated schematically by the functional block diagram of FIGURE 1.

The new and improved all electronic refrigeration control system shown in FIGURE 1 is comprised by a refrigeration system compressor motor 11 and a defrost means formed by a heating element 12. While our system will be described as employing a heating element as the defrosting means, it is obvious that other equivalent and familar defrosting means may be employed and that certain changes obvious to one skilled in the art may be required depending on the specific defrosting means employed. The motor 11 and heating element 12 are connected in series circuit relationship with first and second gate controlled conducting means 13 and 14, respectively. The gate controlled conducting means 13 and 14 are illustrated as both comprised by gate controlled bidirectional conducting power semiconductor devices which may be either a triac, a gated biswitch, a quadrac, a symistor, or other similar gate controlled bidectional conducting device. The triac is a commercially available gate controlled bidirectional conducting semiconductor switch manufacaured and sold by the Semiconductor Products Department of the General Electric Company located in Syracuse, New York. For a description of the triac, reference is made to application note 200.35, issued February 1964, entitled, "Triac Control for AC Power," by E. K. Howell published by the Semiconductor Products Department of the General Electric Company, located in Syracuse, New York. See also the article entitled, "Bilateral SCR Lets Designers Economize on Circuitry," appearing in the Jan. 20, 1964, issue of Electronics Design Magazine. The quadrac is a bilateral switching device having many characteristics similar to the triac, as is the symistor which is a device manufactured and sold in France. While a more detailed description of the characteristics of triacs can be obtained from the above-referenced articles, the following description is thought to be adequate for the purposes of this disclosure.

The triac can conduct current in either of two directions depending upon the polarity of the potential across its load terminals. The motor 11 and the triac 13 are connected in series circuit relationship across a pair of alternating current power supply terminals 15 and 16, and the heating element 12 and the triac 14 similarly are connected in series circuit relationship across the same power supply terminals. It can be appreciated, therefore, that the following discussion relative to the characteristics of the triac is equally applicable to both triacs 13 and 14. For convenience, only triac 14 will be mentioned. If the potential of the supply terminal 15 is positive with respect to the supply terminal 16, triac 14 (when gated on) will conduct current in the direction from terminal 15 to terminal 16. If on the other hand, the potential of terminal 16 is positive with respect to the potential of terminal 15, triac 14 (when gated on) will conduct current in the direction from terminal 16 to terminal 14. The bidirectional conducting triac 14 can be triggered into a conducting state by a low voltage signal level gating signal applied to its control gate element. Once it is triggered into conduction, the triac remains conducting until the current flowing through the device is reduced below a known minimum holding current value. This is known as its latching characteristic since it is similar in effect to a latching relay. In the circuit of FIGURE 1, both the triac 14 and 13 will be turned off automatically upon the supply alternating current passing through its zero value region. In this region the current through the triac drops below the minimum holding value so that the device automatically turns off. Accordingly, it will be appreciated that during each half-cycle of the supply alternating current, the triacs 14 and 13 will automatically turn off, and that if they are not again gated on during the next successive half-cycle they will remain off in their blocking non-conducting condition.

Zero crossing synchronous switching of power circuits supplied from alternating current or full wave rectified power sources has at this time become accepted as the best approach to the use of power semiconductors for controlling power supplied to home appliances or other apparatus where radio frequency interference becomes a problem. Such zero crossing synchronous switching circuits for power semiconductors have been described previously, for example, in application Ser. No. 456,670 (General Electric patent docket 14D–3731) entitled, "Zero Crossing Synchronous Switching Circuits for Power Semiconductors," filed May 18, 1965, Clifford M. Jones and John D. Harnden, Jr., inventors, and in application Ser. No. 584,702 entitled, "Zero Crossing Synchronous Switching Circuits for Power Semiconductors Supplying Non-Unity Power Factor Loads," D. L. Watrous, inventor, filed concurrently with this application and both assigned to the assignee of the present application. Zero crossing synchronous switching requires that current through a load be established or interrupted as the alternating current or half or full wave rectified current, passes through the zero value region. Switching under these conditions reduces radio frequency interference effetcs to a minimum and eliminates the need for substantial filter circuits. Hence, switching circuits utilizing this concept are far less expensive, smaller in size and operate more reliably and efficiently than circuits employing other control techniques.

The interruption of current flow through a triac power semiconductor during the current zero crossing of an applied alternating current or full wave rectified supply potential, presents no problem since the device naturally turns off if the holding current through it drops below a known minimum holding value, as mentioned above. Turn-on of a power semiconductor during the zero crossing interval, however, requires that the turn-on control circuit have the capability of sensing the zero crossing interval, and then turn on the triac power semiconductor only during this interval. Suitable turn-on circuits for this purpose for use with both unity power factor loads, and non-unity power factor loads are described in detail in the above-identified copending applications, and reference is made to each of these applications for a full explanation of the characteristics of such turn-on circuits. For the purpose of the present application, it is believed that the following description is adequate.

Each of the triacs 14 and 13 have their control gate elements, indicated at 17 and 18, respectively, connected to monolithic synchronously operable control gating circuits 19 and 21, respectively. The defrost heating element 12 supplied by triac 14 is essentially a pure resistive load so that it exhibits a unity power factor. For this reason, the monolithic gating circuit 19, hereinafter referred to as the second synchronously controlled circuit means, may be of the type described in the above-identified copending application by Jones and Harnden. The characteristics of this circuit are described more fully hereinafter in connection with FIGURES 2 and 3; however, for the present purposes it is sufficient to point out that the circuit is capable of sensing the voltage and current zero of the supply alternating potential appearing across terminals 15 and 16, and if appropriate at this point in the supply potential, applies a gating-on potential to the control gate 17. To determine whether or not the gating-on signal will be applied to the control gate 17, the synchronously operable control circuit 19 has coupled thereto a temperature sensing means comprised by a temperature sensitive resistor or thermistor $R_t$. As is described more fully hereinafter, the temperature sensing resistor $R_t$ serves to develop a control signal that is applied through the synchronously operable control circuit 19 to gate on triac 14 under conditions where it is desired that the defrost heating element 12 be energized. Energizing potential for the thermistor $R_t$ may be supplied from the synchronously operable control circuit 19 which can be designed to incorporate a rectifying circuits for this purpose. This rectifying circut is supplied through dropping resistor $R_1$ from the supply terminals 15, 16 and may include a smoothing capacitor $C_1$. Energizing power thus derived is applied to the thermistor $R_t$ from suitable dropping resistors $R_r$ and $R_F$ connected in series circuit therewith across the smoothing capacitor $C_1$.

Due to the fact that the compressor motor 11 is inductive in nature, it will exhibit a non-unity power factor load characteristic to the triac 13 so that the monolithic gating circuit 21, hereinafter referred to as the first synchronously operable control circuit means, should be of the type described in the above-identified copending application by D. L. Watrous. Here again, the second synchronously operable control circuit means 21 will be described more fully hereinafter in connection with FIGURES 2 and 3, but it is deemed sufficient at this point to indicate that the circuit serves to sense the zero crossing interval of the current flowing through the triac 13, and to supply to the triac 13 during such interval a gating on signal which will render it conductive. Whether or not such a gating on signal will be supplied to the control gate 18 of triac 13 by control circuit 21 will be determined by the operating conditions of the refrigeration system as measured by a cold control temperature sensing resistor $R_{cc}$ which functions to sense the temperature of the space being refrigerated. When the temperature of the space being refrigerated rises above a predetermined value, for example 50° F., the temperature sensitive resistor $R_{cc}$ causes the synchronously operable control circuit means 21 to supply a gating on signal to the control gate 18 of triac 13. This results in causing the compressor motor 11 to be operated thereby reducing the temperature in the space to a desired lower value.

In addition to the control provided by the cold control temperature resistor $R_{cc}$, an overheat temperature sensor such as that shown at $R_{tL}$ may also be provided for the synchronously operable control circuit 21. This overheat temperature sensor may be thermally coupled to the motor windings of motor 11 so as to sense an overheating condition for these windings, and to provide an override control of the operation of the circuit 21 thereby preventing further turn on of triac 13 until the overheated condition has been corrected. For convenience, the cold control resistor $R_{cc}$ and the overheat temperature sensing resistor $R_{tL}$ are shown connected in series circuit relationship with suitable dropping resistors connected across the smoothing capacitor $C_1$.

To prevent operation of the compressor motor 11 simultaneously with the defrost heat element 12, an interlock feedback connection shown by the conductor 22 and the resistor $R_2$, is provided between one load terminal of the triac 14 and the first synchronously operable control circuit means 21 so as to lock out or prevent operation of this contol circuit while the triac 14 is conducting. By this means it is assured that the compressor motor 11 and the defrost heating element 12 cannot be operated simultaneously so that the two are working against each other.

From the above description it will be appreciated that during normal operation of the refrigeration system, the cold control temperature sensing resistor $R_{cc}$ will sense the temperature of the space being refrigerated. Upon this temperature rising above a desired predetermined value, the first synchronously operable control circuit means 21 will cause a gating on signal to be supplied to the control gate 18 of triac 13 thereby energizing the compressor motor 11. This results in reducing the temperature of the space back down below its predetermined desired value. During normal operating conditions such cycling on and off will be determined strictly by the conditions existing in the space being refrigerated which are of course dictated by the number of door openings, etc. so that the amount of power consumed by the system to maintain a desired refrigerated condition is determined only by the actual operating conditions in the space being refrigerated. Further it should be noted that since the compressor motor 11 is directly controlled by the triac 13, the system is in a sense all electronic in that it responds immediately to a call for cooling by the cold control temperature sensing resistor $R_{cc}$. No undesired thermal time lag due to thermally actuated relays etc. are introduced into the system so that its response to a call for cooling is immediate.

If, after a period of continuous operation, frost builds up on the evaporator elements of the refrigeration system, such build up in frost will be sensed by the defrost temperature sensing resistor $R_t$. Upon this occurence the second synchronously operable control circuit means 19 will supply a gating on signal to the triac 14 thereby energizing the defrosting heating element 12. Simultaneously with turn on of the triac 14, the first synchronously operable control circuit means 21 will be inhibited from further operation due to the interlock connection 22 so as to assure that the motor 11 cannot be turned on during the defrosting process. In addition to the defrost control, if for some reason the compressor motor 11 becomes overheated, such overheated condition will be sensed by the motor temperature sensing resistor $R_{tL}$. This overheat sensing resistor is connected to the first synchronously operable control circuit means 21 in such a manner that it also can inhibit further operation of the first control circuit means until such time that the overheat condition is corrected.

Because of the nature of the first and second synchronously operable control circuit means 21 and 19, respectively, the triacs 13 and 14 are turned on only during the zero crossing intervals of the supply alternating current. The manner in which this is accomplished is explained in greater detail in the above-identified copending applications, and will be explained more fully hereinafter in connection with FIGURES 2 and 3. For the present purposes it is believed adequate to point out that the circuits do serve to turn on either the triac 13 or triac 14 at the current zero so that it is allowed to conduct for the ensuing half cycle, and for any number of following half cycles as required by the condition to be corrected. Since the triac devices 13 and 14 automatically turn off at the end of each half cycle, it will be appreciated that each one will be allowed to conduct for a number of integral half cycles as required by the control condition to be met. Thus by varying the number of integral half cycles that the triac 13 or the triac 14 is allowed to conduct, control of the operation of the refrigeration system is maintained. Since turn on and turn off of the triacs 13 and 14 occurs only during the zero crossing intervals, no substantial radio interference effects are produced as a consequence of the turn on and turn off thereby eliminating any need for substantial filter circuits etc. to prevent undesired radio interference effects on television sets and/or radio sets in the surrounding area also supplied by the same power source supplying the terminals 15 and 16.

FIGURE 2 of the drawings is a detailed circuit diagram of an all electronic refrigeration control system constructed in accordance with the teachings of the present invention. As shown in FIGURE 2 of the drawings, the compressor motor 11 and first triac 13 are connected in series circuit relationship across the pair of power supply terminals 15 and 16. As explained in connection with FIGURE 1 of the drawings, the control gate 18 of triac 13 is connected to the output from a synchronously operable control circuit means shown generally at 21 for supplying gating on signal pulses to the control gate 18 on appropriate occasion. As a result the triac 13 is rendered conductive during the zero crossing intervals of the supply alternating current applied through terminals 15 and 16. For this purpose, the synchronously operable control circuit means 21 is comprised by a continuous low voltage gating potential source formed by a terminal 25 connected across a filter capacitor 26 that is connected through a diode rectifier 27 and limiting resistor 28 across the pair of power supply terminals 15 and 16. By this arrangement, the diode rectifier 27 half wave rectifies the supply alternating current potential appearing across terminals 15 and 16 and supplied through limiting resistor 28 to develop a continuous low value direct current gating voltage across the filter capacitor 26 having a value of about $-10$ volts. This continuous low voltage direct current gating potential appears between the terminals 25 and 16.

The synchronously operable control circuit means 21 is further comprised by gating means including an npn junction transistor 31 having its emitter connected to the D.C. terminal 25 and its collector connected through a limiting resistor 32 to the control gate 18 of triac 13. The base of the gating transistor 31 is connected through a limiting resistor 33 to the output from a sensing and turn on signal means indicated generally at 34. The sensing and turn on signal producing means 34 comprises a means for sensing the rise in potential across the triac 13 as well as the polarity of the rise in potential, and derives a gating on potential that is supplied through the limiting resistor 33 to the base of the gating transistor 31 to thereby supply a gating on pulse to the control gate of triac 13.

The sensing and turn on signal producing means 34 is comprised by a first pnp junction transistor 36 having its collector connected to the limiting resistor 33, its base connected to the terminal 16 and its emitter connected through a blocking diode 37 and a limiting resistor 38 to that load terminal of triac 13 opposite the load terminal to which the supply terminal 16 is connected. A second pnp junction transistor 39 is provided which has its emitter connected to the supply terminal 16, its collector connected to the limiting resistor 33 and its base connected through a blocking diode 41 and limiting resistor 38 to the load terminal of triac 13. By this arrangement, as the supply alternating current goes through zero value, the triac 13 returns to its blocking non conducting condition, and thereafter the potential across the triac 13 starts to rise. The polarity of this rise in potential is determined by the polarity of the supply terminals 15 and 16. If the terminal 15 is positive with respect to the terminal 16, then the pnp transistor 36 will be rendered conductive to supply a turn-on signal to the base of the gating transistor 31. Alternatively, during half cycles when the supply terminal 16 is positive with respect to the supply terminal 15, the pnp junction transistor 39 will be rendered conductive to supply a turn-on signal to the base of the gating transistor 31. For impedance matching purposes a high value resistor 43 is connected between the supply terminal 16 and the junction of the two blocking diodes 37 and 41.

If nothing more than the above circuitry were provided, then the triac 13 would be rendered conductive throughout every half cycle of the supply alternating current potential. However, in addition to this circuitry, the first synchronously operable control circuit means 21 further includes shunting means comprised by a shunting npn junction transistor 45 having its collector connected to the base of the gating transistor 31 and having its emitter connected to the gating potential terminal 25. The base of the shunting transistor 45 is connected through a limiting resistor 46 to the collector of a control transistor 47 having its emitter connected to the supply terminal 16 and having its base connected to the output from a differential amplifier means 49 to be described more fully hereinafter. As a consequence of this arrangement upon differential amplifier 49 supplying a turn-on signal through control transistor 47 to shunt transistor 45, shunt transistor 45 thereafter shunts away turn-on signals from the base of gating transistor 31 and prevents further turn-on of triac 13.

The differential amplifier means 49 is comprised by a npn junction reference transistor 51 having its base connected between the juncture of a pair of voltage dividing resistors 52 and 53 connected in series circuit relationship between the D.C. gating potential terminal 25 and the supply terminal 16. The emitter of the reference transistor 51 is connected through a common emitter reference resistor 54 to the D.C. gating potential terminal 25 and the collector of reference transistor 51 is connected through a pair of load resistors 55 and 56 to the supply terminal 16. In addition to reference transistor 51, the common emitter bias resistor 54 also is connected in common to the emitters of a plurality of npn junction inhibit transistors 57a, 57b, and 57c. The collectors of the inhibit transistors 57a, 57b, and 57c are connected in common through a conductor 58 to the base of the control transistor 47 for controlling turn-on of the control transistor 47.

The base of the inhibit transistor 57b is connected to a temperature sensing means thermally coupled to the space being refrigerated for sensing the temperature thereof and for deriving a control signal indicative of the rise in temperature of this space above a predetermined desired value. This temperature sensing means preferably comprises a cold control temperature sensitive resistor 66, known as a thermistor, having one of its terminals connected to the base of the inhibit transistor 57b and having its remaining terminal connected to the source of D.C. gating potential terminal 25. The base of inhibit transistor 57b is also connected through a feedback resistor 65 to the collector of the reference transistor 51 of the differential amplifier.

It should be noted that while the use of point contact temperature sensing thermistors is preferred, the invention is in no way restricted to use with such sensors. For certain installations wide area temperature sensors could be used with equal facility. It is obvious that sensitive contact making thermal sensors may be employed also.

During normal operating conditions the differential amplifier means 49 is adjusted such that the bias applied to the base of the reference transistor 51 by the voltage dividing resistors 52 and 53 maintains this transistor normally conducting. As a consequence, the bias developed across the common bias resistor 54 maintains the inhibit transistor 57b turned off for normal settings of the temperature sensing thermistor 66. While in the circuit illustrated the temperature sensing thermistor 66 has a negative temperature coefficient of resistance, obviously other characteristics could be accommodated. As a consequence, for so long as the temperature in the space being refrigerated is above the desired preset value, thermistor 66 will exhibit only a small resistance value so that the base of inhibit transistor 57b is maintained sufficiently negative to keep it from conducting. Under these conditions, the sensing and turn-on signal deriving means 34 will supply continuous turn-on signals to the base of gating transistor 31 causing it to gate on triac 13 to keep compressor motor 11 running. However, upon the temperature of the space being refrigerated going below the preset cool value, the resistance of thermistor 66 increases sufficiently to drive the base of inhibit transistor 57b sufficiently positive to cause it to become conductive. Upon the inhibit transistor 57b being rendered conductive, a negative turn-on potential is applied to the base of the control transistor 47 which in turn is rendered conductive, and applies a positive turn-on signal to the shunt transistor 45. Upon the shunt transistor 45 being turned on, it will shunt the turn-on signals away from the base of the gating transistor 31 thereby preventing further turn-on of the triac 13. This condition will be maintained for so long as the temperature in the space being refrigerated is maintained below the desired preset cool value. Upon this temperature rising, the resistance of thermistor 66 decreases sufficiently to again drive the base of inhibit transistor 57b negatively causing it to turn off. Consequently, a new cooling cycle as described above will commence.

It is important to note that the value of bias required to cause the inhibit transistor 57b to turn off is different from that required to cause it to turn on. This is due to the effect of the feedback resistor 56. During turn-on of inhibit transistor 57b, with the reference transistor 51 conducting, the value of bias required to turn on the inhibit transistor 57b is determined by the combined effect of two paths. One of the paths comprises feedback resistors 56 and 55, resistor 65, and thermistor 66. The other path is comprised by resistors 56, 55, transistor 51, and bias resistor 54. During turn-off of inhibit transistor 57b, however, the transistor 51 is non-conducting so that the value of bias required for turn off is determined only by the path comprised by resistors 56, 55, 65, and thermistor 66. By proper adjustment of the value of feedback resistor 65, the temperature at which the bias applied to the base of inhibit transistor 57b causes this transistor to be rendered non-conductive can be made to be different from the temperature at which it is turned on. As a consequence, it can be appreciated that the circuit exhibits hysteresis effects which can be readily controlled. Thus, for example, by proper adjustment of the parameters of the circuit the cold control inhibit transistor 57b can be made to turn on at a temperature say of 45° F., and can be made to turn off at a temperature of 50° F.

In addition to the cold control inhibit transistor 57b, the differential amplifier means 49 further includes an overheat inhibit transistor 57a. The overheat inhibit transistor 57a has its base connected between the juncture of an overheat temperature sensing thermistor 62 and a bias resistor 61 connected in series circuit relationship between gating potential terminal 25 and the juncture of the two bias resistors 56 and 55. Overheat temperature sensing thermistor 62 is designed to be thermally coupled to the motor winding of compressor motor 11 to sense an overheated condition of these windings in the event of overload, failure to start, etc.

The operation of overheat inhibit transistor 57a and overheat sensing thermistor 62 is similar to the operation of cold control thermistor 61, and hence will not be repeated in detail. It should be noted however, that overheat sensing thermistor 62 in effect operates as a feedback resistor so that here again the combination of 57a with reference transistor 51 in the circuit arrangement illustrated will exhibit a desired hysteresis effect as described above.

The third inhibit transistor 57c has its base connected to an interlock circuit means for preventing operation of compressor motor 11 during periods when defrost heating element 12 of the circuit is being operated. Before describing this portion of the circuit, however, it is believed desirable to first describe in detail the construction of the second synchronously operable control circuit means 19 for controlling conduction of triac 14 and thereby controlling operation of defrost heating element 12.

The second synchronously operable control means 19 is comprised by a source of continuous low voltage signal level direct current gating potential formed by low voltage D.C. terminal 25 which as stated earlier is connected across smoothing capacitor 26 with the charge on smoothing capacitor 26 being maintained by diode rectifier 27 which is connected in series circuit relationship with a dropping resistor 28 across power supply terminals 15 and 16. The second synchronously operable control circuit means 19 is further comprised by gating means formed by a pnp junction gating transistor 71 having its collector connected to the low voltage D.C. gating potential terminal 25 and having its emitter connected through a limiting resistor 72 to the control gate 17 of triac 14. The base of gating transistor 71 is connected through a limiting resistor 73 to low voltage gating potential terminal 25. With this arrangement, in the absence of other factors, the negative polarity gating potential from terminal 25, applied through limiting resistor 73 to the base of gating transistor 71, would cause this transistor to be turned on so that a gating potential is applied to control gate 17 of triac 14. In order to control the application of this gating on potential to control gate 17 through gating transistor 71, however, shunt means are provided.

The shunt means is comprised by a first shunt transistor 74 having its collector connected to the base of gating transistor 71 and having its base connected to the supply terminal 16. The emiteer of the first shunt transistor 74 is connected to the juncture of a pair of voltage dividing resistors 75 and 76 connected in series circuit relationship with the rectifying diode 27 between the power supply terminal 16 and the low voltage gating potential terminal 25. In order to limit the voltage of the circuit during the half cycles of the supply potential when the terminal 15 is positive, a bypass diode 77 is provided around the voltage dividing resistor 76. The shunt means is further comprised by a second shunt transistor 78 having its collector connected to the base of the gating transistor 71 and having its emitter connected to the supply terminal 16. The base of the second shunt transistor 78 is connected through a blocking diode 79 to the juncture of the two voltage dividing resistors 75 and 76. As a consequence of this arrangement, it will be seen that the first shunt transistor 74 during the greater part of the half cycles of the supply voltage, while terminal 16 is negative with respect to terminal 15, will be rendered conductive so as to shunt or clamp the base of gating transistor 71 to essentially the same potential as the emitter load terminal of triac 14 thereby preventing gating transistor 71 from being turned on. Similarly during the alternate half cycle when supply terminal 16 is positive with respect to supply terminal 15, second shunt transistor 78 will be rendered conductive during the greater part of that half cycle so as to clamp or shunt the base of gating transistor 71 thereby preventing it from being turned on. Accordingly, the only time that either one or the other of the first and second shunt transistors 74 and 78 are not conducting is during the zero crossing interval. If during this interval no control potential is applied to either of the shunt transistors to cause them to turn-on, a turn-on potential will be applied to the base of gating transistor 71 causing it to be turned on, and apply a gating on potential to the control gate of triac 14. Since the base of first shunt transistor 74 is connected directly to supply terminal 16, there is no way in which to extraneously control conduction of first shunt transistor 74 during the zero crossing interval. However, second shunt transistor 78 has its base connected back through a conductor 80 to the output from a differential amplifier means 81 for controlling the conductivity of second shunt transistor 78 during the zero crossing interval of the supply alternating current.

The second differential amplifier means 81 is comprised by an npn junction reference transistor 82 having its emitter connected through a common bias resistor 83 to the low voltage D.C. gating potential terminal 25 and having its collector connected though a voltage dividing resistor 84 to supply terminal 16. The base of reference transistor 82 is connected to the juncture of a pair of voltage dividing resistors 85 and 86 connected in series circuit relationship between low voltage gating potential terminal 25 and supply terminal 16. The second differential amplifier means 81 is further comprised by an inhibit transistor 87 having its emitter connected through common bias resistor 83 to low voltage gating potential terminal 25 and having its collector connected through conductor 80 to the base of second shunt transistor 78. The base of inhibit transistor 87 is connected to the juncture of a voltage dividing resistor 89 and a temperature sensitive variable resistance thermistor 91 connected in series circuit relationship between low voltage gating potential terminal 25 and the collector of reference transistor 82.

The above described arrangement is entirely similar in construction and operation to the first differential amplifier 49 described with relation to the first synchronously operable control means 21, and hence will not be again described in detail. It is believed sufficient to point out that temperature sensitive thermistor 91 is positioned on or near the evaporator of the refrigerator system. Thus if frost should bulid up the resistance of thermistor 91, which has a negative temperature coefficient of resistance, increases. As a consequence, the potential applied to the base of inhibit transistor 87 by the voltage divider comprising resistors 89, 91 and 84 will be sufficiently negative to maintain this transistor turned off. With inhibit transistor 87 turned off, second shunt transistor 78 likewise will remain turned off through the zero crossing interval so that turn-on signals will be supplied to the base of gating on transistor 71 thereby turning it on and applying gating on signals to control gate 17 of triac 14 under these conditions. Turn-on of triac 14 will of course cause heating element 12 to be heated up by the energization thereof through an appropriate number of successive half cycles of the supply alternating current. Upon frost being removed as a result of this defrosting action of heating element 12, the resistance of temperature sensitive thermistor 91 will heve decreased (due to its negative temperature coefficient of resistance) to a value such that a positive gating on potential will be applied to the base of inhibit transistor 87. Upon this occasion transistor 87 turns on and applies a negative polarity enabling potential to the base of second shunt transistor 78. This enabling potential causes second shunt transistor 78 to be rendered conductive even though the zero crossing intervals so that thereafter it will shunt away all turn-on potential from the base of gating transistor 71. This condition will be maintained so long as frost does not build up on the evaporator to a point to again reduce the resistance of temperature sensitive thermistor 91 to a value such that it again causes turn off of inhibit transistor 87. It should be noted here again that because of the feedback connection provided through conductor 92 and temperature sensitive resistor 91, the temperature at which inhibit transistor 87 is turned on can be made to be different from the temperature at which the inhibit transistor is turned off. Thus, it can be appreciated that the desirable hysteresis effect discussed more fully in connection with the first differential amplifier means 49, is also achieved with the second differential amplifier means 81. Further, while a temperature sensing thermistor arrangement has been described specifically for sensing frost build up, other suitable sensing devices could be employed. For example, an optical frost sensing arrangement could be employed in the circuit of FIGURE 2 with satisfactory results, although it might be more expensive to manufacture.

It has been seen that upon frost build up on the evaporators to the point that inhibit transistor 87 is prevented from conducting, reference transistor 82 will be rendered conductive by the positive bias applied to the base thereof from voltage dividing resistors 85 and 86. Conduction of reference transistor 82 will cause a negative polarity enabling potential to appear at its collector electrode which is supplied through conductor 92, a conductor 93 and voltage limiting resistor 94 to the base of an interlock transistor 95. Interlock transistor 95 is a pnp junction transistor having its emitter connected through a limiting resistor 96 and blocking diode 97 to power supply terminal 16 and having its collector connected through a limiting resistor 98 to low voltage gating potential terminal 25. The collector of interlock transistor 95 is also connected through a conductor 99 to the base of third inhibit transistor 57c in differential amplifier means 49 of the synchronously operable control means 21 controlling triac 13.

As a consequence of the above arrangement, upon frost being built up to the point that inhibit transistor 87 is maintained off, reference transistor 82 turns on and supplies a negative enabling potential across conductor 93 that causes pnp interlock transistor 95 to turn on. Turn-on of the interlock transistor 95 in turn supplies an enabling potential to the base of inhibit transistor 57 which thereafter functions in the manner similar to inhibit transistors 57a and 57b described previously to inhibit conduction through triac 13. In this manner, a positive lock out of the operation of the refrigerator compressor motor 11 during the defrost interval is provided.

The overall operation of the circuit arrangement shown in FIGURE 2 is set forth in the following description. During normal operation of the refrigeration control system, compressor motor 11 will be cycled on and off in accordance with the demands for cooling as required by the setting of cold control thermistor 66 as set forth above. When the temperature in the space being refrigerated is above that called for by the setting of thermistor 66, inhibit transistor 57b will be maintained off so that gating on signal potentials will be supplied to control gate 18 of triac 13 through gating transistor 31 by either one of the turn-on transistors 36 or 39, thus allowing motor 11 to run and cool the space. Upon temperature in the refrigerated space reaching the desired preset value (for example 5° below the temperature at which motor 11 was turned on) the bias applied to the base of inhibitor transistor 57b by cold control thermistor 66 is such that this transistor turns on. Upon this occurrence, control transistor 47 is turned on applying a positive polarity turn-on signal to the base of shunt transistor 45 which thereafter shunts away turn-on signals from the base of gating transistor 31. This prevents further turn-on triac 13 and stops further operation of compressor motor 11. In such normal operating cycles the hysteresis effect provided by differential amplifier means 49 operates to allow motor 11 to be turned on at a different temperature from that at which it is turned off by the synchronously operable control means 21 as described previously.

In the event that the motor windings of the compressor motor 11 become overheated to an overload condition, failure to start, etc., the overheat sensing thermistor 61 will sense this condition, and will cause inhibit transistor 57a to be turned on. Upon inhibit transistor 57a being turned on, it will function in a manner similar to that described with relation to inhibit transistor 57b to prevent further application of gating on signal pulses to the control gate of triac 13. In the event that other types of override controls or other protective measures are desired, additional inhibit transistors such as 57a can be added to provide for such additional override controls.

If after a period of normal operation as described above, frost builds up on the evaporators of the refrigerator system to a point such that the resistance of thermistor 91 increases so that inhibit transistor 87 is turned off, reference transistor 82 automatically turns on. As a result of turn off of inhibit transistor 87, the enabling potential will be removed from the base of the second shunt transistor 78 so that it will be maintained off during the zero crossing interval. As a consequence of the removal of the enabling potential from the base of second shunt transistor 78, this shunt transistor is no longer effective to shunt away the enabling turn-on potential from the base of gating transistor 71 during the zero crossing intervals of the supply alternating current. As a consequence, gating transistor 71 will be turned on to supply gating potential to control gate 17 of triac 14 thereby energizing defrosting heating element 12 for a sufficient period to eliminate undesired frost buildup. Concurrently with this action, turn-on of reference transistor 82 supplies a negative polarity enabling potential across conductor 93 to cause interlock transistor 95 to be turned on. Turn-on of interlock transistor 95 in turn provides an enabling potential to the base of inhibit transistor 57c so as to inhibit further operation of triac 13 thereby assuring that motor 11 will not operate in opposition to the effect of defrost heating element 12 during the derfost cycle.

The embodiment of the invention shown in FIGURE 3 of the drawings is similar in many respects in both construction and operation to the embodiment of the invention shown in FIGURE 2. The FIGURE 3 circuit differs from that shown in FIGURE 2 however in the construction of the interlock means for preventing operation of compressor motor 11 during periods of operation of defrost heating element 12. In addition the embodiment of the invention shown in FIGURE 3 of the drawings provides a separate low voltage gating power source for gating potential supply for first synchronously operable control circuit means 21 which is separate and distinct from the gating potential supply comprised by smoothing capacitor 26 used for the second synchronously operable control circuit means 19. For this purpose the embodiment of the invention shown in FIGURE 3 includes a series connected diode rectifier 101 and Zener diode 102 connected in series circuit relationship between power supply terminal 16 and a second low voltage direct current gating potential supply terminal 25'. A second smoothing capacitor 103 is connected in parallel circuit relationship with series connected diode rectifier 101 and Zener diode 102 between supply terminal 16 and low voltage gating terminal 25'. The juncture formed by the cathode of diode 101 and the anode of Zener diode 102 is connected through a limiting resistor 104 back to the juncture of triac 14 with defrost heating element 12. As a result of this connection it will be appreciated that during the alternate half cycle while supply terminal 15 is negative with respect to supply terminal 16, and assuming that triac 14 is non conducting, diode rectifier 101 will serve to charge second smoothing capacitor 103 negatively with the polarity shown, and to provide a low voltage direct current gating potential with negative polarity to gating potential terminal 25'. Zener diode 102 serves to limit the voltage between terminals 25' and 16 to a desired value. However, in the event that triac 14 is conducting, the voltage across this device collapses so as to deprive the rectifying circuit comprised by limiting resistor 104, diode rectifier 101 and smoothed capacitor 103 of its voltage source. Thus it can be appreciated that these elements in effect constitute interlock means interconnected between second gate control triac 14 and the power source for the first synchronously operable control circuit means 21 whereby conduction of second triac 14 deprives first synchronously operable control means 21 of its power source.

In addition to the above described differences over the FIGURE 2 circuit, the circuit arrangement of FIGURE 3 includes certain additional details of override control arrangements that can be embodied in the present invention. One of these additional override controls can be comprised by relay actuated contacts such as the normally closed contact shown at 105 connected between cold control temperature sensing thermistor 66 and the base of inhibit transistor 57b, and the normally open contact 106 connected between supply terminal 16 and the base of inhibit transistor 57b. Each of these relay actuated contacts may be arranged in such a manner that they respond to overheat, overpressure, or any other control phenomenon such that when actuated, normally closed contact 105 opens and normally open contact 106 closes to apply a positive polarity turn-on potential through limiting resistor 107 to the base of inhibit transistor 57b. Thereafter upon turn-on of inhibit transistor 57b control transistor 47 will be turned on to thereby turn-on shunt transistor 45 and prevent further turn-on of triac 13 in the above described fashion.

In addition to the above modifications, the circuit of FIGURE 3 illustrates the manner in which a negative temperature coefficient temperature sensing thermistor indicated at 111 can be physically mounted adjacent a motor winding 112 of compressor motor 11 to sense an overheating condition of the winding. The overheat temperature sensing thermistor 111 has one of its load terminals connected through a conductor 113 to supply terminal 16 and has its remaining load terminal connected through a conductor 114 and through a limiting resistor 115 to the low voltage gating potential terminal 25'.

Conductor 114 is also connected through a feedback resistor 116 to the collector of reference transistor 51 and is connected through a conductor 117 to the base of an inhibit transistor 57a. By this arrangement, as the winding 112 of compressor motor 11 becomes overheated, the resistance of the overheat temperature sensing thermistor 111 decreases to a point such that a positive enabling potential is applied to the base of inhibit transistor 57a thereby inhibiting further operation of the synchronously operable control circuit means 21 in the previously described manner.

As one alternative to the compressor motor winding overheat override control provided by thermistor 111, the circuit of FIGURE 3 may be modified to incorporate an overpressure sensor shown at 119 which is mounted in a conduit 121 or other suitable point in the refrigerant supply piping system to sense the pressure of the refrigerant being pumped by the compressor. Assuming that the pressure sensing device 119 is of the type which varies the resistance at its output, such as a strain-gage pressure transducer, then the output terminals of such device may be connected directly to conductors 113 and 114 in the manner shown by the dotted lines 122 and 123. In operation, increase of the pressure of the refrigerant fluid flowing in conduit 121 above a predetermined safe value causes the resistance of pressure transducer 119 to change and vary the current through conductors 122, 123 etc. to turn-on inhibit transistor 57a in the previously described manner to thereby inhibit further operation of the synchronously operable control circuit means 21.

From the foregoing description it can be appreciated that the present invention provides an all electronic control system for a refrigerator which is fast responding, provides automatic defrost, exhibits substantially no undesirable radio frequency interference effects without requiring substantial costly and bulky filter elements, greatly reduces electrical or acoustical transients generated internally of the refrigerating system and includes a positive interlock to prevent simultaneous operation of the cold control and the automatic defrost. (If static starting means are employed complete elimination of such internally generated transients is obtained). In addition to all of these desirable characteristics, the refrigerator control system according to the invention is designed in such a manner that it can be fabricated to a great extent in integrated circuit form in that it employs only low voltage low power dissipation elements in its control circuitry, and hence is relatively inexpensive to manufacture, reliable in operation and easily serviced. In addition, the control system includes an exeremely simple and inexpensive differential amplifier arrangement which by proper adjustment can be designed to provide desirable hysteresis effects such that the temperature of turn-on of the control can be made different from the temperature of turn off. Further, the electronic refrigeration control system according to the invention can be readily modified to include overheat protection, overpressure protection or other ancillary control functions deemed desirable for protective or other reasons.

Having described several embodiments of a new and improved all electronic refrigeration control system contructed in accordance with the invention, it is believed obvious that other modifications and variations of the invention are possible in the light of the above teachings. Thus, for example, circuit elements 13 and 14 may be other types or combinations of semiconductor devices, such as gate, radiation, or field controlled silicon controlled rectifiers, triacs, transistors, and the like. Also, while we have described our system as being applied to a refrigerator cycle system employing a compressor motor, other refrigerating systems such as those employing other types of compressors, or systems without compressors, such as a gas evaporation cycle system, may be substituted for the compressor motor refrigerating system.

All the benefits and advantages of our invention occur when it is applied to such other systems. It is, therefore, to be understood that changes may be made in the particular embodiments of the invention described which are within the full intended scope of the invention as defined by the appended claims.

What we claim as new and desire to secure by Letters Patent of the United States is:

1. An electronic refrigeration control system exhibiting substantially no undesired radio frequency interference effects, electrical or acoustical transients, and the like, including in combination a refrigeration cycle system and a first gate controlled conducting device connected in series circuit relationship across a set of alternating current power supply terminals, first synchronously operable control circuit means operatively coupled to said power supply terminals and to the control gate of said first gate controlled conducting device for controlling conduction through said device synchronously with the zero crossing intervals of the supply alternating current potential, sensing and control signal deriving means coupled to said first gate controlled conducting device and to said first synchronously operable control circuit means for controlling operation of said first synchronously operable control circuit means, defrost means operatively coupled to the refrigeration system for defrosting the same in the event of frost build-up above a predetermined quantity, a second gate controlled conducting device connected in series circuit relationship with said defrost means across said power supply terminals, and second synchronously operable control circuit means operatively coupled to said power supply terminals and to the control gate of said second gate controlled conducting device for controlling conduction through said second device synchronously with the zero crossing intervals of the supply alternating current potential.

2. The electronic refrigeration control system according to claim 1 in which said refrigeration system includes a compresor motor and further comprising interlock means effectively intercoupled between said refrigeration system motor and said defrost means for preventing actuation of one while the other is energized.

3. The electronic refrigeration control system according to claim 2 wherein the interlock means comprises an interconnection between the first and second synchronously operable control means for rendering the first synchronously operable control means inactive during actuation of the second synchronously operable control means.

4. The electronic refrigeration control system according to claim 2 wherein the interlock means comprises an interconnection between the second gate control conducting device and the power source for the first synchronously operable control means whereby conduction of said second gate control conducting device deprives the first synchronously operable control means of its power.

5. The electronic refrigeration control system according to claim 2 further comprising temperature sensing means operatively coupled to the space being refrigerated by said refrigeration system for sensing the temperature thereof and electrically coupled to said first synchronously operable control means for controlling the operation thereof and thereby controlling the operation of said refrigeration system motor, and frost build-up sensing means operatively coupled to the refrigeration system for sensing build-up of frost therein and deriving a control signal upon the build-up of frost reaching a predetermined level, said frost build-up sensing means being electrically coupled to said second synchronously operable control means for controlling the operation thereof and thereby controlling the operation of said defrost means.

6. The electronic refrigeration control system according to claim 5 further including differential amplifier means comprising part of synchronously operable control means and having bias means coupled thereto adjusted to exhibit hysteresis effects in the point of turn-on and the point of turn-off of the gate controlled conducting devices associated with each of said first and second synchronously operable control means.

7. The electronic refrigeration control system according to claim 6 further comprising over heat sensing means thermally coupled to the compressor motor windings to sense overheating of the windings and to derive an override control signal indicative of the over heated condition, and means for coupling the override control signal thus derived to the first synchronously operable control means for controlling the operation thereof and thereby provide an override control of the operation of the compressor motor.

8. An electronic refrigeration control system exhibiting substantially no undersired radio frequency interference effects, electrical, or acoustical transients, and the like, including in combination a refrigeration system compressor motor and a first power semiconductor load current carrying gate controlled conducting device connected in series circuit relationship across a source of alternating current supply potential, first synchronously operable control circuit means coupled to and controlling the first gate control power semiconductor device comprising means for providing a continuous low voltage gating potential, first gating means operatively coupled to the means for providing the gating potential and operatively coupled to the control gate of the gate control power semiconductor device for applying a gating on signal to the device to cause the same to conduct load current therethrough sensing and turn on signal producing means operatively coupled to the first gate control power semiconductor device and to said gating means for sensing a build up in potential across said power semiconductor device and supplying a turn on signal to said first gating means, first shunt means operatively coupled to the first gating means for shunting the first gating means, temperature sensing means operatively coupled to the space being refrigerated by said refrigration system for sensing the temperature thereof and electrically coupled to said first shunt means for controlling the operation of said first shunt means and thereby controlling the operation of said refrigeration system motor, a defrost heating element thermally coupled to the refrigeration system for defrosting the same in the event of frost build up above a predetermined level, a second gate controlled power semiconductor device connected in series circuit relationship with said defrost heating element across said source of alternating current supply potential, and second synchronously operable control circuit means operatively coupled to said source of supply potential and comprising means for providing a continuous low voltage signal level gating potential, second gating means operatively coupled to the means for providing the gating potential and operatively coupled to the control gate of said second gate controlled power semiconductor device for applying a gating on signal to the device to cause the same to conduct current through said defrost heating element, second shunt means operatively coupled to the second gating means for shunting the second gating means, and frost build up sensing means operatively coupled to the refrigeration system for sensing build up of frost therein and deriving a control signal upon the build up of frost reaching a predetermined level, said frost build up sensing means being electrically coupled to said second shunt means for controlling operation of said second shunt means and thereby controlling operation of said defrost heating element.

9. The electronic refrigeration control system according to claim 8 further comprising interlock means effectively intercoupled between said refrigeration system motor and said defrost heating element for preventing actuation of one while the other is energized.

10. The electronic refrigeration control system according to claim 9 further including differential amplifier means comprising a part of each of said first and second synchronously operable control means, each of said differential amplifier means having bias means coupled thereto adjusted to exhibit hysteresis effects in the point of turn on and the point of turn off of the gate control power semi-conductor device being controlled by its associated synchronously operable control means.

11. The electronic refrigeration control system according to claim 10 wherein the interlock means comprises an interconnection between the first and second synchronously operable control means for rendering the first synchronously operable control means inactive during actuation of the second synchronously operable control means.

12. The electronic refrigeration control system according to claim 10 wherein the interlock means comprises an interconnection between the second gate control conducting device and the power source for the first synchronously operable control means whereby conduction of said second gate control conducting device deprives the first synchronously operable control means of its power.

13. The electronic refrigeration control system according to claim 10 further comprising over heat sensing means thermally coupled to the refrigeration system motor windings to sense overheating of the windings and to derive an override control signal indicative of the overheated condition, and means for coupling the override control signal thus derived to the first synchronously operable control means for controlling the operation thereof and thereby provide an override control of the operation of the refrigeration system motor.

14. An electronic refrigeration control system according to claim 10 further comprising pressure sensing means physically coupled to the refrigeration system for sensing build up of pressure therein above a predetermined value and for deriving an override control signal indicative of the undesired high pressure condition, and means for applying the override control signal thus derived to the first synchronously operable control means for controlling the operation thereof and thereby provide an override control of the operation of the refrigeration system motor.

15. An electronic refrigeration control system including in combination a refrigeration cycle system and defrost means for the refrigeration system, first and second gate controlled semiconductor power devices connected in series circuit relationship with said refrigeration system and said defrost means, respectively, across a source of alternating current supply potential, first and second control circuit means operatively coupled to the control gate of said first and second gate controlled semiconductor power devices, respectively, for controlling conduction through said devices, temperature sensing means for sensing the temperature of the space being refrigerated and for controlling operation of said first control circuit means in response thereto, means for sensing build up of frost in said refrigeration system and controlling operation of said second control circuit means in response thereto, and interlock means effectively intercoupled between said refrigeration system and said defrost means for preventing actuation of one while the other is energized.

16. The electronic refrigeration control system according to claim 15 in which the refrigeration system includes a compressor motor and further including differential amplifier means comprising a part of each of said first and second control circuit means, each of said differential amplifier means having bias means coupled thereto adjusted to exhibit hysteresis effects in the point of turn on and the point of turn off of the gate control semiconductor power device controlled by its associated control circuit means.

17. The electronic refrigeration control system according to claim 16 further comprising overheat sensing means thermally coupled to the refrigeration system motor windings to sense overheating of the windings and to derive an override control signal indicative of the overheated condition, and means for coupling the override control signal thus derived to the first control ciriuit means for controlling the operation thereof and thereby provide an override control of the operation of the refrigeration system motor.

18. An electronic refrigeration control system according to claim 16 further comprising pressure sensing means physically coupled to the refrigeration system for sensing build up of pressure therein above a predetermined value and for deriving an override control signal indicative of the undesired high pressure condition, and means for applying the override control signal thus derived to the first control circuit means for controlling the operation thereof and thereby provide an override control of the operation of the refrigeration system motor.

References Cited

UNITED STATES PATENTS

| | | | |
|---|---|---|---|
| 3,222,882 | 12/1965 | Sutton | 62—156 XR |
| 3,248,892 | 5/1966 | Sutton | 62—156 |
| 3,335,576 | 8/1967 | Phillips | 62—156 |

MEYER PERLIN, *Primary Examiner.*